United States Patent [19]

Yamada

[11] Patent Number: 5,081,867
[45] Date of Patent: Jan. 21, 1992

[54] SEMICONDUCTOR SENSOR

[75] Inventor: Keizo Yamada, Tokyo, Japan

[73] Assignee: NEC Corporation, Japan

[21] Appl. No.: 415,712

[22] Filed: Oct. 2, 1989

[30] Foreign Application Priority Data

Sep. 30, 1988 [JP] Japan ................................ 63-248058
Sep. 30, 1988 [JP] Japan ................................ 63-248066
Sep. 30, 1988 [JP] Japan ................................ 63-248067

[51] Int. Cl.$^5$ ............................................. G01P 15/08
[52] U.S. Cl. ................................................. 73/517 R
[58] Field of Search ............... 73/777, 862.64–862.67,
    73/754, 517 R, 517 B; 338/2, 5, 4, 6, 47, 36–41;
    177/211

[56] References Cited

U.S. PATENT DOCUMENTS

| 3,601,209 | 8/1971 | Paelian | 73/862.65 |
| 3,712,123 | 1/1973 | Laimins | 73/862.65 |
| 3,985,025 | 10/1976 | Ormond | 73/862.66 |
| 4,017,819 | 4/1977 | Pien | 338/36 |
| 4,812,199 | 3/1989 | Sickafus | 73/862.64 |
| 4,849,730 | 7/1989 | Izumi et al. | 338/5 |

FOREIGN PATENT DOCUMENTS 0169366 7/1989 Japan .................................. 73/517 R
1534276 11/1978 United Kingdom .................... 338/5

OTHER PUBLICATIONS

Roylance et al., "A Batch-Fabricated Silicon Accelerometer" IEE Transactions on Electron Devices, vol. ED-26, No. 12, Dec. 1979.

Primary Examiner—Robert R. Raevis

[57] ABSTRACT

A semiconductor sensor comprising a semiconductor sensor member provided on a support member. The sensor member has a base portion and a rim portion connected to each other by a beam portion. The base portion is fixed to the support member and the rim portion is held by the beam portion such that the rim portion is spaced apart from the base portion and the support portion. The beam portion is provided with a resistor to detect the changes of resistance values of the resistor due to mechanical stress caused at the beam portion.

7 Claims, 10 Drawing Sheets

_FIG. 5._

_FIG. 6._

FIG_18.

FIG_20.

SEMICONDUCTOR SENSOR

BACKGROUND OF THE INVENTION

This invention relates to a semiconductor sensor, and more particularly to a semiconductor acceleration sensor.

As an example of prior art semiconductor sensors, an accelerometer is discussed at pp. 1911-1917 of IEEE Transactions on Electron Devices, Vol. ED-26, No, 12, December, 1979. This accelerometer is basically structured by the step of etching a silicon substrate to create a rectangular silicon supporting rim in which a mass or weight is supported by an extremely thin silicon beam. The beam is provided with a resistor. The stress induced in the beam by vibration of the mass is detected electrically in terms of changes in the resistance values of resistors. In such a semiconductor accelerometer, the detection sensitivity of acceleration is proportionate to the weight of the mass. As the substrate is made of silicon single crystal of <100> orientation, and the mass element is fabricated by anisotropic etching, there is formed between the mass element and the surroundings an interstice in the form of a V-shaped groove at an angle of 54.7°. The width of the groove inevitably becomes as wide as the thickness of the substrate to thereby pose a problem in minimizing sizes. If the size of the accelerometer is to be reduced, the size of the mass which occupies the central portion should be reduced, but when the width of the mass is reduced close to the thickness of the wafer, it is inconveniently etched laterally in the case where a single crystal <100> silicon is used as the substrate. Therefore, the mass element cannot be fabricated precisely to the design dimensions by the anisotropic etching. The conventional method is defective in that when the structure is reduced in dimension, the weight of the mass which is greatly influential to determination of frequency characteristic of such semiconductor accelerometer cannot be set with a high precision. Further, even if the mass is formed in a size allowing reasonably good etching, it still is impossible to form a mass having an arbitrary weight within a space limited by a supporting rim which provides a cantilever. In order to form the mass with a weight sufficient to allow detection of acceleration, there is no alternative but to enlarge the outer circumferences of the supporting rim. It was heretofore extremely difficult to minimize the size of such accelerometer.

This limitation of the prior art is not limited to semiconductor accelerometers alone, but is shared by dynamic sensors such as a semiconductor dynamic sensor, a pressure sensor, etc. A physical quantity (such as temperature or light) can be detected by transducing them it into a mechanical quantity applied on a weight or a beam and reading it with a semiconductor sensor. Such sensors, however, are not free of the above defects.

SUMMARY OF THE INVENTION

An object of the present invention is to provide a sensor structure which is free of the aforementioned problems and which is formed with a weight necessary for effective detection of the physical quantity within a limited space and which has a higher sensitivity in acceleration detection with less fluctuation among devices.

The present invention provides a semiconductor sensor comprising a sensor member providing on a support member. The sensor member has a base portion and a rim portion connected to each other by a thin beam portion. The base portion is fixed to the support member and serving as the reference point for measurement at the center of the device. The rim portion is held by the beam portion such that the rim portion is spaced apart from the base portion and the support member. The beam portion is provided with a resistor to detect the changes of resistance values of the resistor due to mechanical stress caused at the beam portion.

The semiconductor sensor according to this invention needs the base portion for making a physical connection with an object of measurement. The size of the base portion is arbitrarily selected so long as it is large enough to fix a beam portion sufficiently for detecting acceleration. If the base portion is reduced in size while maintaining the conventional shape of a sensor, it is found that the position of the center of gravity falls within the rim portion. Contrary to the conventional structure, the base portion for measurement is placed at a narrow region at the center of the sensor according to this invention. This enables the base portion to be at the gravity center to thereby present an extremely stable structure even though the base portion may be very small. Moreover, all the semiconductor areas except for beams located around the base portion may be used as the weight. Compared with the conventional sensor where all the peripheral areas of a chip should be used as the base portions, the ratio of a weight against the total area and the weight of a chip can be increased for more easily. It becomes simple to increase the weight of a mass which is a necessary factor to enhance detection sensitivity of the physical quantity. Further, as the volume of a weight or a mass is larger, it becomes easier to set a design precision compared to the prior art where it has only a small value, thereby minimizing fluctuation in sensitivity among the devices. When the fixed point is determined in this way, it becomes easy to provide beams in a plural number or extend the length thereof as well as to enhance the directivity and the detection sensitivity.

DETAILED DESCRIPTION OF THE PREFERRED EMBODIMENTS

Figure 1:
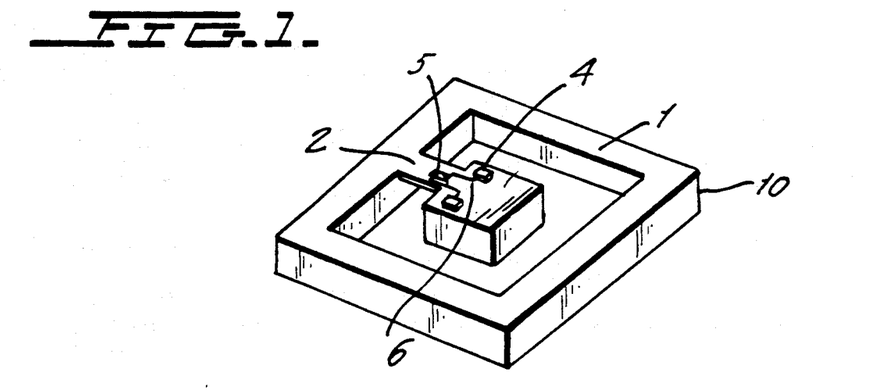
FIG. 1 is a perspective view to show the basic structure of the first embodiment of the semiconductor sensor device according to this invention.

Referring to FIG. 1, semiconductor sensor device 10 is formed by etching a semiconductor wafer wherein a rim portion 1 which serves as a weight and a base portion 3 are spaced apart from each other and connected by a thin beam portion 2. In the figure, the embodiment has the base portion 3 at the center of the rim portion 1, which has the form of a rectangular frame, and the beam portion 2 has a thickness less than those of the base portion 3 and the rim portion 1. A gauge resistor 5 is formed on the surface of the beam portion 2 by ion implantation, and is electrically connected on both ends thereof to electrode pads 4 formed on the base portion 3 via circuits 6.

Figure 2:
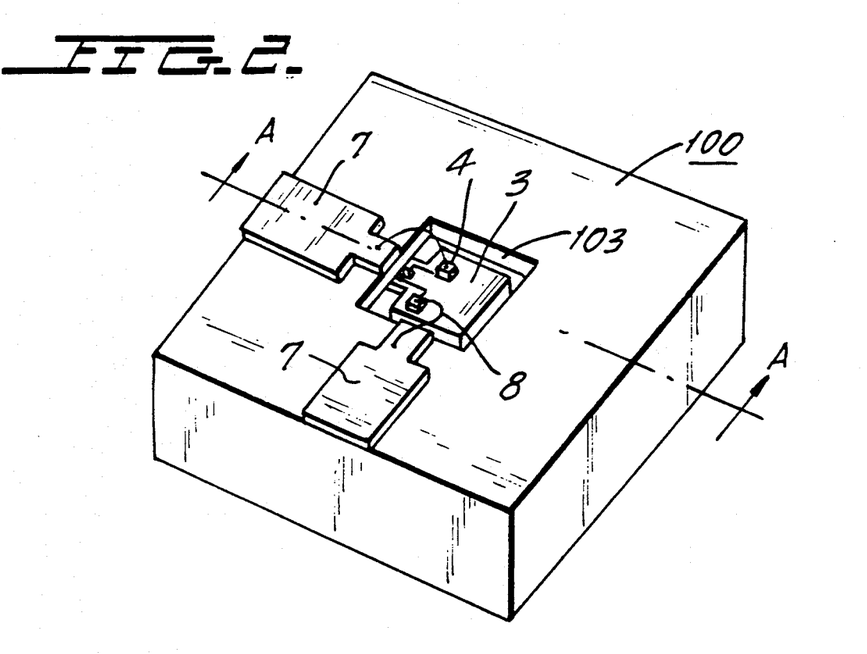
FIG. 2 is a perspective view to show the sensor device of FIG. 1 housed in a package.
Figure 3:
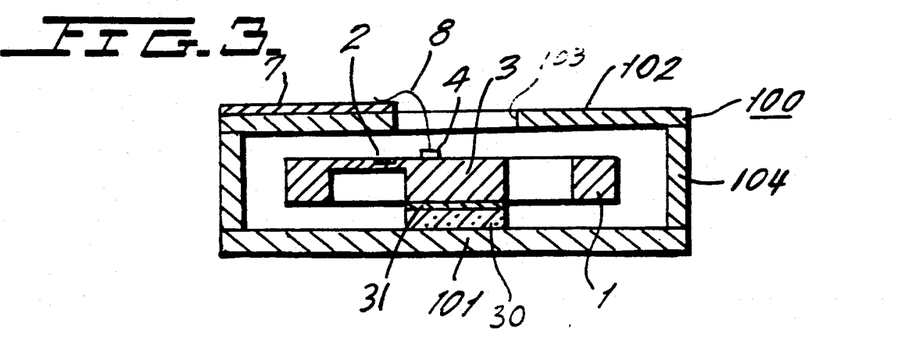
FIG. 3 is a cross-sectional view of FIG. 2 along the line A—A thereof.

As shown in FIGS. 2 and 3, the sensor device 10 of this type is housed within a package 100 having a projection 30 on the bottom plate 101 thereof for positioning. In packaging, the sensor device 10 is housed therein by fixing the base portion 3 upon the projection 30 via an adhesive layer 31 and electrically connecting a lead terminal 7 formed on an upper plate 102 of the package with the electrode pads 4 with bonding wires 8 through an opening 103 on the package. The upper plate 102 and the bottom plate 101 are separated by a spacer 104 to prevent the beam portion 2 and the rim portion 1 of the sensor device 10 from contacting the inner walls of the package 100. When the projection 30 is formed with photosensitive resin, photosensitive resin of predetermined thickness is placed on the bottom plate 101 in advance, and a sensor device is placed thereon. The bottom plate 101 may be a transparent plate such as a glass plate. With an appropriate mask, the plate is exposed to light for development. This causes the projection and the sensor device to firmly fix with each other without damaging the sensor device.

Figure 4A:
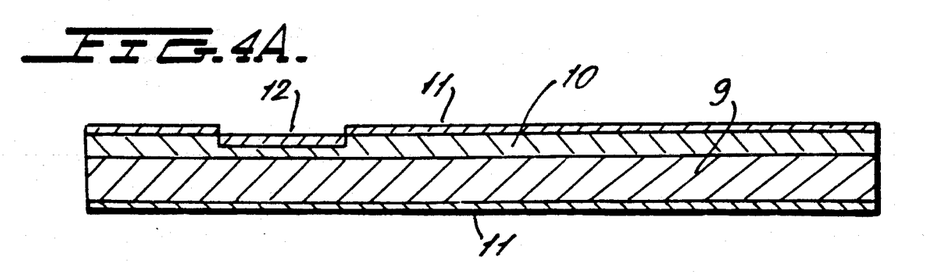
FIGS. 4A through 4E are sectional views to explain the manufacturing process of the sensor device shown in FIG. 1.
Figure 4B:
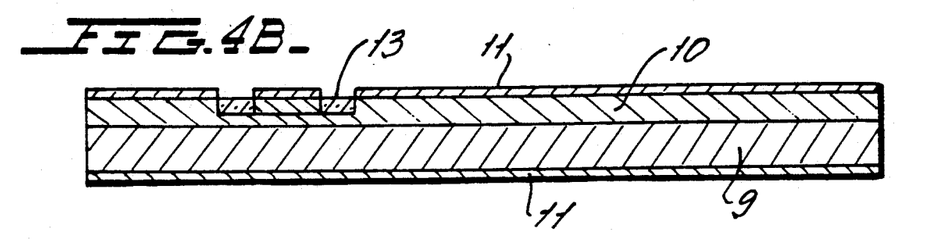
Figure 4C:
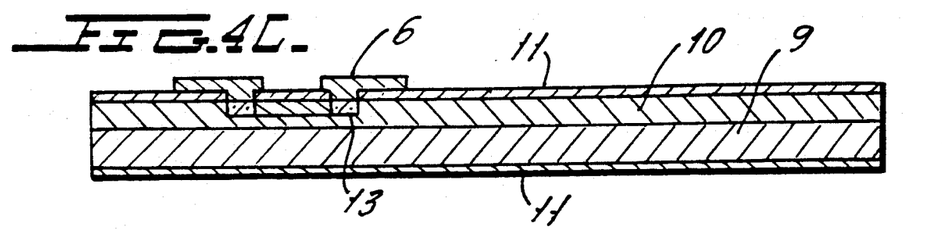
Figure 4D:
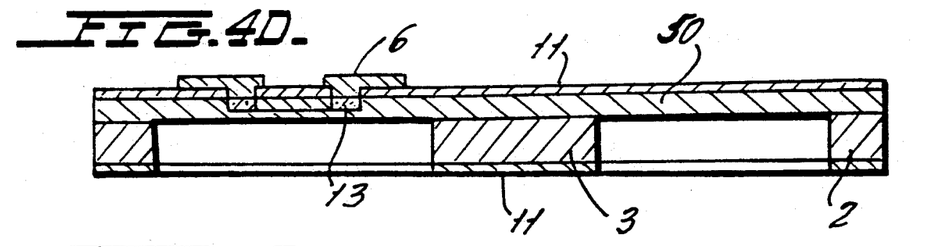

The accelerometer shown in FIG. 1 is manufactured by the process steps shown in FIGS. 4A through 4E. A p-type single crystal silicon 9 of <100> orientation is used as the substrate. An epitaxial layer 10 of n-type is grown on the surface. The epitaxial layer 10 is used as the beam portion 2. A gauge element is first formed by a known semiconductor manufacturing process. Silicon oxide film 11 is formed on both sides of the substrate. The silicon oxide film on the surfaces is partly etched off to form a window through which ions may be implanted to fabricate a gauge resistor. Boron is implanted through the window to form a p-type layer implanted with impurities 12 in the n-type epitaxial layer or the p-type strain gauge resistor 5 shown in FIG. 1 for detection of acceleration (FIG. 4A). Then $p^+$ diffusion layer 13 is made on both sides of said p-type resistor and an ohmic contact is formed to take out electric signals (FIG. 4B). Silicon oxide is deposited by CVD method thereon to open silicon oxide on said contact region, and then aluminum layer is vapor-deposited. The electric circuit or wire 6 and the pad 4 are formed by etching an aluminum layer (FIG. 4C). Silicon oxide film on the back of the semiconductor substrate is partly removed, and using the remaining part as a mask, the layer is anisotropically etched with a solution such as KOH or hydrazine. Etching is automatically suspended at or about the interface between the epitaxial layer and the substrate if an appropriate electric voltage is being applied continuously on the n-type epitaxial layer. Therefore, the surface is formed as a diaphragm form except for the central fixed base portion and the peripheral weight region (FIG. 4D). In the prior art mentioned above, a metal having a large weight density such as gold is superposed on silicon, because the weight is not heavy enough to detect acceleration if silicon is used alone. Whe a metal is superposed as the weight, a plating method is usually employed. When electroplating is employed, complicated pre-processing, which requires the weight to be designated in advance, becomes necessary in order to achieve a superior electric conductivity necessary for electroplating, or silver or nickel has to be vapor-deposited in order to improve adhesiveness, thereby pushing up cost and reducing yields. According to this invention, such metal plating is not necessary at all, thereby shortening the manufacturing process. If detection sensitivity is to be further improved in this invention process, an additional metal plating process may be carried out.

Figure 4E:
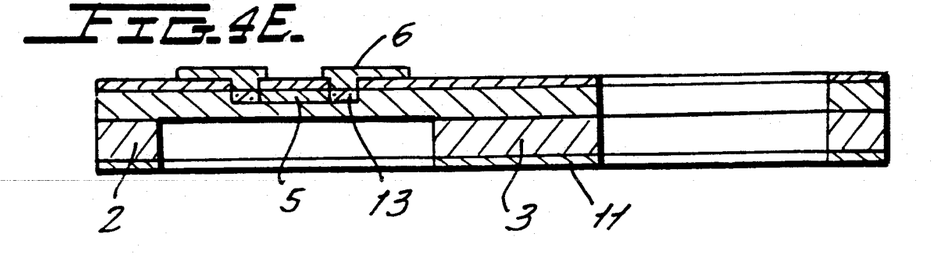

The substrate is further etched from above the upper surface in order to shape the diaphragm 50 thus fabricated by the above step into a beam portion 2 to complete the accelerometer of this embodiment (FIG. 4E).

When acceleration in vertical directions is applied to the semiconductor accelerometer, the rim portion 1 moves up and down in proportion to the magnitude of the acceleration. By using the changes in the gauge resistor 5 fabricated at the supporting part of the beam portion 2, the acceleration is transduced into electric signals. By providing an arbitrary protrusion 30 in the package 100, a space in which the rim portion 1 can be vibrated is provided. The space can be created by shaving off the rim portion 1 of silicon from the thickness of the substrate which is equivalent to the height at the center thereof where the semiconductor accelerometer is fixed. If the interval between the rim portion 1 and the bottom plate 101 is suitably set in the absence of acceleration, the package can also function as a stop, which prevents the sensor from being destroyed when excessive acceleration is applied to the beam portion.

Figure 5:
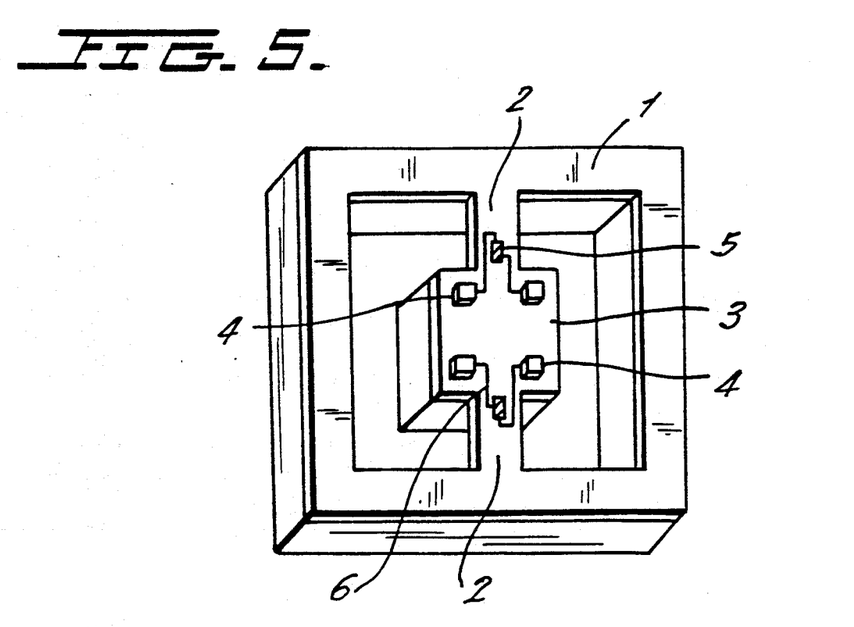
FIG. 5 is a perspective view to show the second embodiment of the semiconductor sensor device according to this invention.
Figure 6:
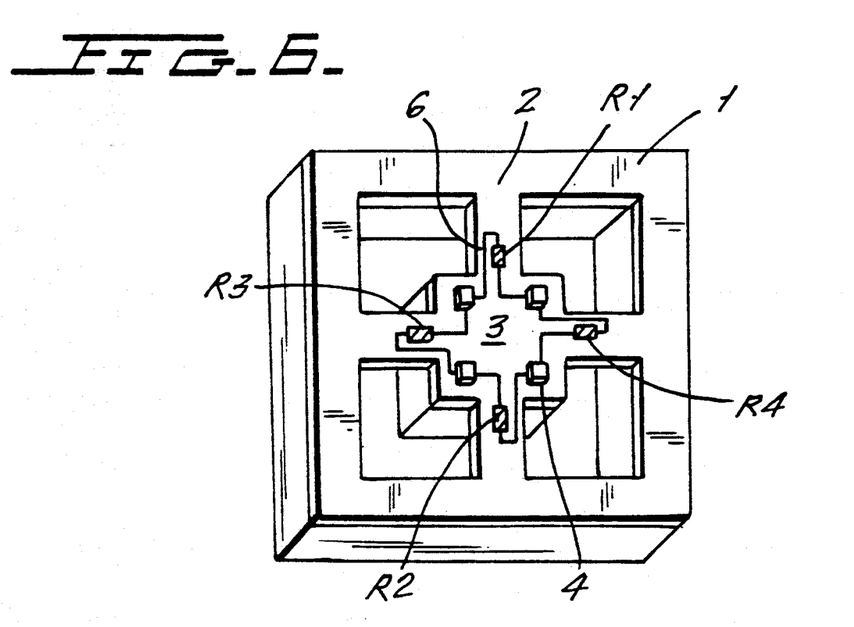
FIG. 6 is a perspective view to show the third embodiment of the semiconductor sensor device according to this invention.

FIG. 5 shows the second embodiment wherein two beams are provided so that acceleration signals in the direction other than the vertical direction in respect to the substrate surface can be ignored. As piezoresistors may be fabricated on the two beams, sensitivity can be enhanced. If the number of the beams is four such as in the third embodiment shown in FIG. 6, the directivity of sensing the acceleration as well as the sensitivity can further be improved. The accelerometer can be increased in sensitivity and directivity by providing a plural number of beams.

Figure 7:
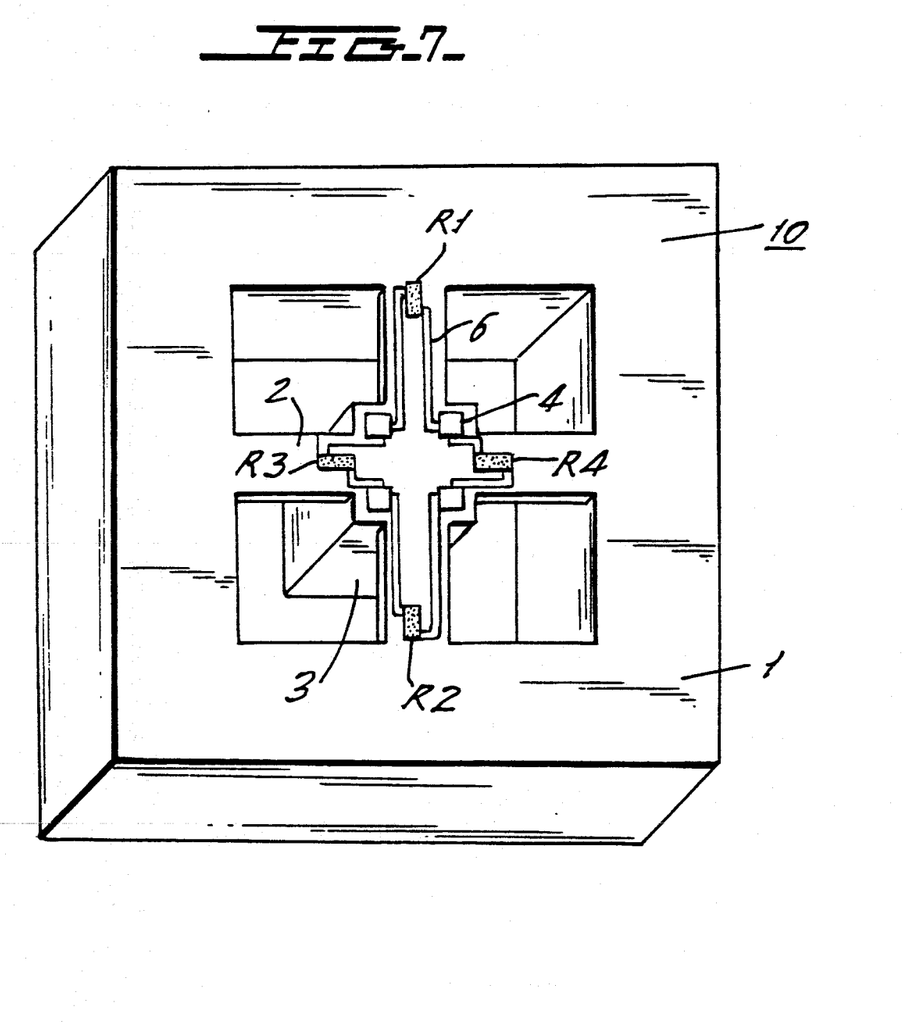
FIG. 7 is a perspective view to show the fourth embodiment of the semiconductor sensor device according to this invention.
Figure 8:
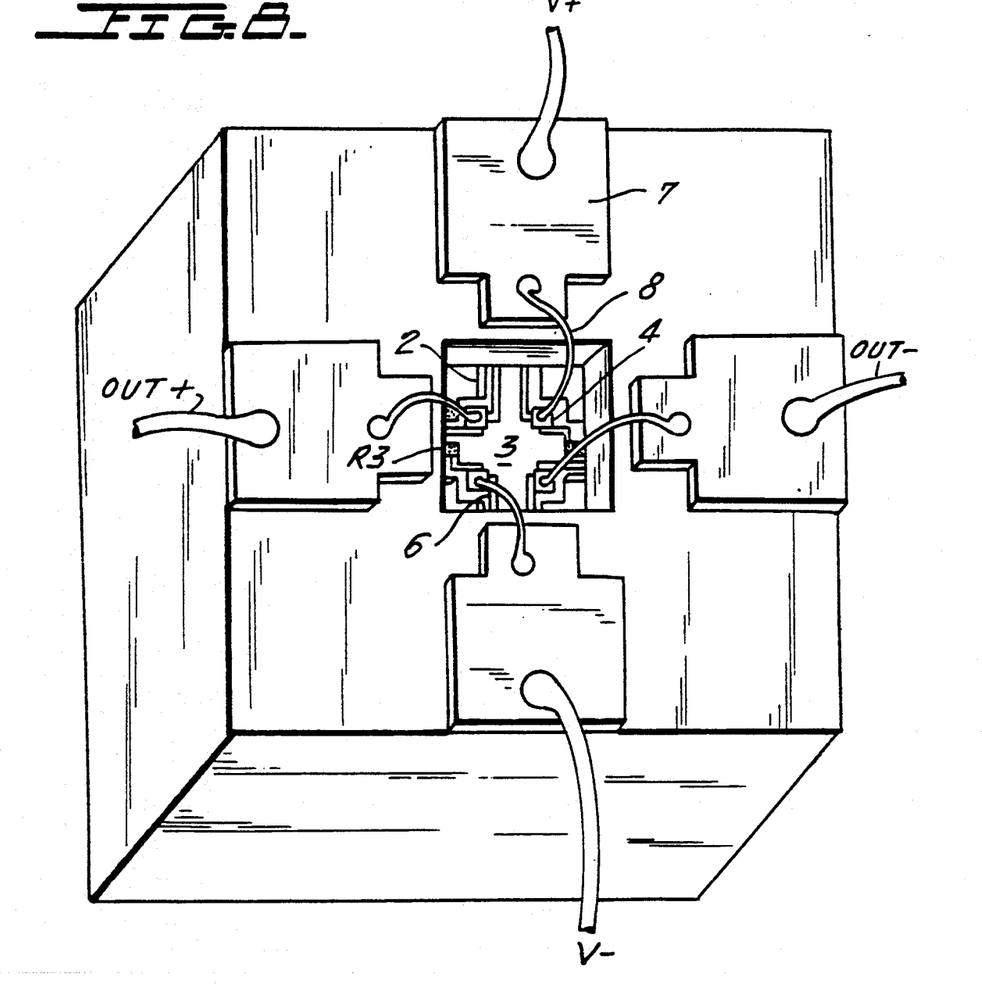
FIG. 8 is a perspective view to show the sensor device of FIG. 7 when it is housed in a package.
Figure 9:
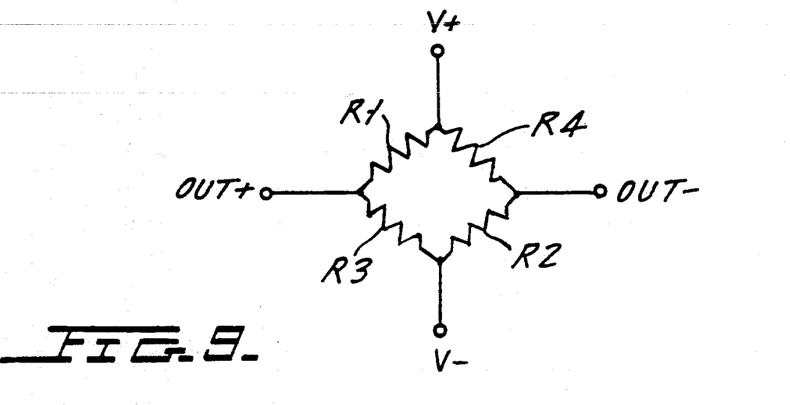
FIG. 9 is an equivalent circuit of the resistor arrangement shown in FIG. 7.

When acceleration is applied to the sensor, the beam is flexed to produce a stress on the supporting portion in proportion to the magnitude of the acceleration. The stress makes a change in the banded structure of the semiconductor gauge resistors. The resistance of the gauge resistors changes due to the effect of "piezoresistance" in proportion to the stress in a wider region. The effect is characterized in that it is anisotropic when a single crystal is used as the substrate, and the symbols of the changes in resistance thus produced differ depending on the difference in plate orientation of the crystal. In the embodiment shown in FIGS. 7 and 8, a full-bridge circuit is formed as shown in FIG. 9 by connecting four piezoresistors. More particularly, four piezoresistors having the same initial values are connected in series and alternate terminals of the four terminals are divided into two groups equally; one of the groups is set designated as input terminals while the other is designated as output terminals. If a predetermined voltage is applied to the input terminals marked with V+ and V−, voltage appears at the output terminals in proportion to $R1 \times R2 - R3 \times R4$. Therefore, if the resistance of any one of the resistors changes in proportion to the acceleration, electric signals proportional to the acceleration are available at the output terminals. The larger the difference in initial resistance between adjacent resistors the larger the voltage changes as they are transduced into electric signals. In this embodiment, sensitivity is increased by positioning the gauge resistors of the adjacent beams on opposite sides to each other. That is because when compression occurs on one end of a beam, tensile stree stress occurs on the other end of the beam. In the structure shown in FIGS. 7 and 8, the directivity of sensing the acceleration is excellent.

Figure 10:
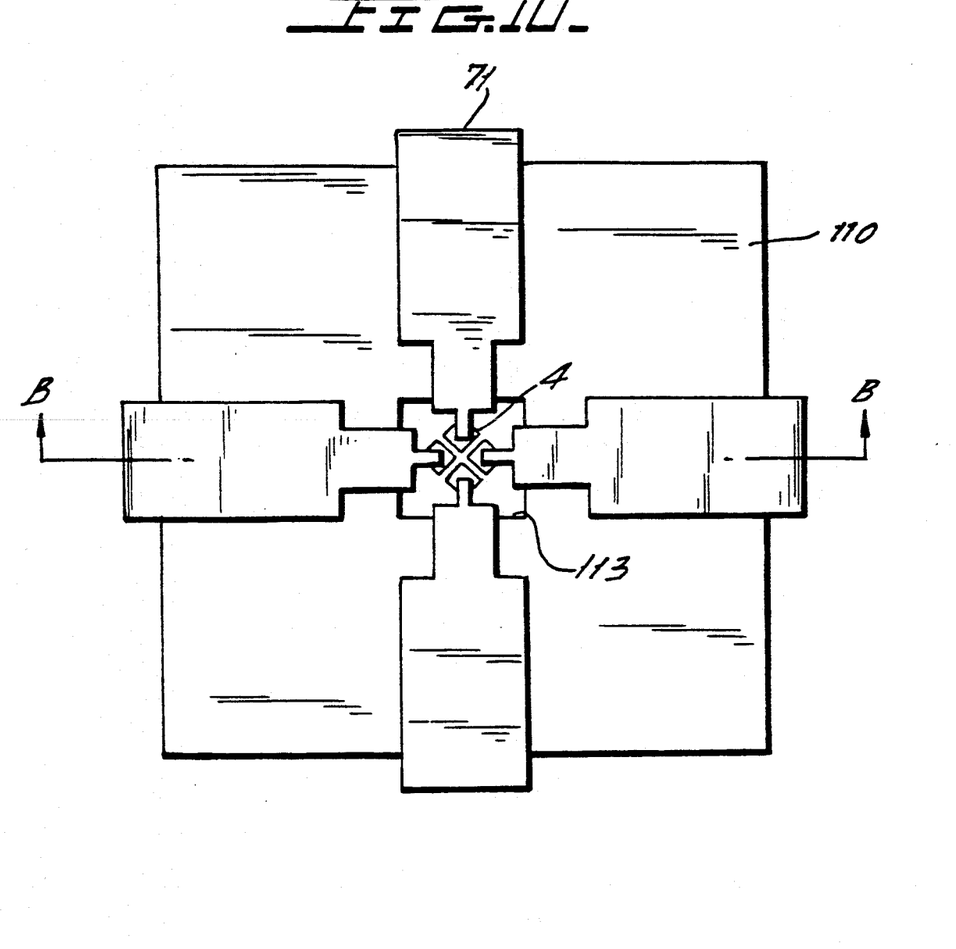
FIG. 10 is a plan view to show another embodiment of a supporting structure of the sensor device.
Figure 11:
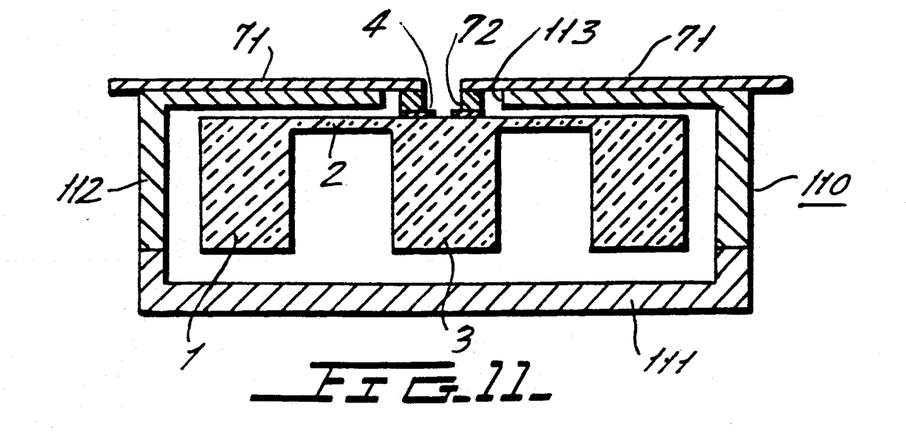
FIG. 11 is a cross-sectional view to show the device in FIG. 10 along the line B—B thereof.

Another embodiment of the semiconductor sensor device is shown in FIGS. 10 and 11 wherein leads in the form of a beam are used. Beam leads 71 having electron-conductivity and mechanical strength are provided at an opening 113 of a package 110. A beam lead 71 is provided with a projected electroconductive connector 72 at the tip end thereof in order to create a space necessary for vibration of the sensor. The upper package 112 with beam leads is aligned positionally with a sensor device to connect the beam leads 71 with electrode terminals 4 of the sensor device. As the sensor device can be placed on a flat plate in the aforementioned operation, a sensor would not be damaged even if a force is applied on the beam leads 71. The sensor is completed by assembling the sensor which has been fixed with the upper package 112 with a lower package 111 having an appropriate recess. Electric connection with outside can be made from the beam leads 71. The dynamic range of the sensor is determined here by suitably adjusting the height of the projected connectors 72.

The semiconductor sensor according to this invention can function as a dynamic sensor without modification if only loads are directly applied on the weight in addition to functioning as an accelerometer. If using this sensor, a scale can be made to have an extremely small size. An extremely minute rod may be contacted with the weight if a load is to be directly applied. When the thickness of beam portion 2 is made larger than that used for the above-mentioned embodiment, a force larger than the above by increment can be measured. For instance even if the sensor of the above embodiment can measure only the force which is in the order of miligrams, the forces in the orders of grams or kilograms may be measured by increasing the thickness of the beams.

The semiconductor sensor according to this invention may be used to detect pressure in addition to acceleration and dynamic quantity. For this purposes, the beams are simply replaced with diaphragms. If the sensor is completed at the step shown in FIG. 4D in the manufacture, it can be used as a pressure sensor.

The sensor according to this invention may be used to detect physical quantities orther than dynamic quantities such as acceleration, force or pressure if only these are transduced into mechanical quantities. For instance, when temperature is to be detected, if a diaphragm made of a material (any material such as a metal or an insulating material) having a different thermal expansion coefficient from that of the semiconductor forming a beam is provided on the beam, the beam functions as a bimetal to produce stress on the gauge resistor, and the temperature can be detected by measuring the stress. A minute rod was mentioned above when the sensor is used as a dynamic sensor, but if physical values other than mechanical quantities such as temperature are transduced into the movement of the rod, they could be detected.

Intensity of light can be measured by detecting the temperature from the beams of the bimetal structure as the temperature changes when intense light is irradiated. Physical quantities may be transduced into another physical quantities and then further transduced into mechanical quantities for easy detection.

Figure 12:
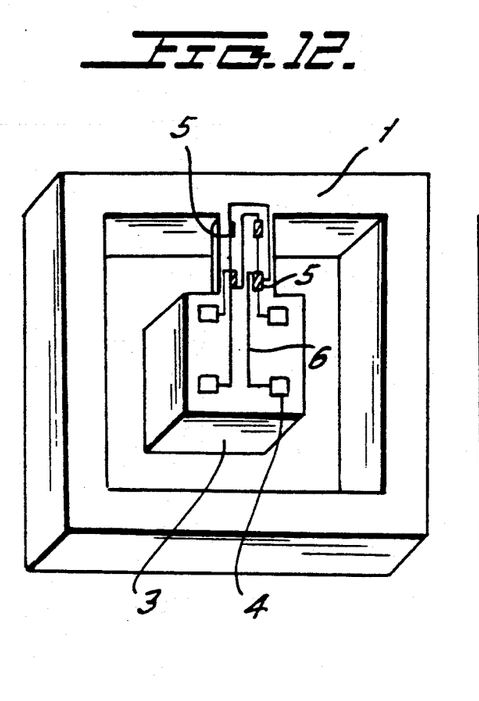
FIG. 12 is a perspective view to show the fifth embodiment of the semiconductor sensor device according to this invention.

The fifth embodiment of this invention sensor is now described referring to FIG. 12. Similarly to the one shown in FIG. 1, the accelerometer of this embodiment is provided with a single beam 2 which is in turn provided with a pair of gauge resistors 5 on the position near the base portion and the rim portion for detection of acceleration. When four gauge resistors are installed like this, since stresses produced on the beam adjacent to the base portion and the rim portion are different in phases by 180 degrees for the same vibration, resistors can be formed in a full-bridge circuit so that all the resistances forming a resistance bridge on a beam are variable in respect of an acceleration input. If it is assumed that silicon has the same breaking strength irrespective of positions, the structure will achieve the highest durability when it is designed so that the same stress is produced on each resistor. When the stress produced on a beam actually fabricated differs between the base portion 3 and the rim portion 1, the width of the beam portion 2 having the smaller stress is preferably reduced symmetrically to make the stress values the same level.

Figure 13:
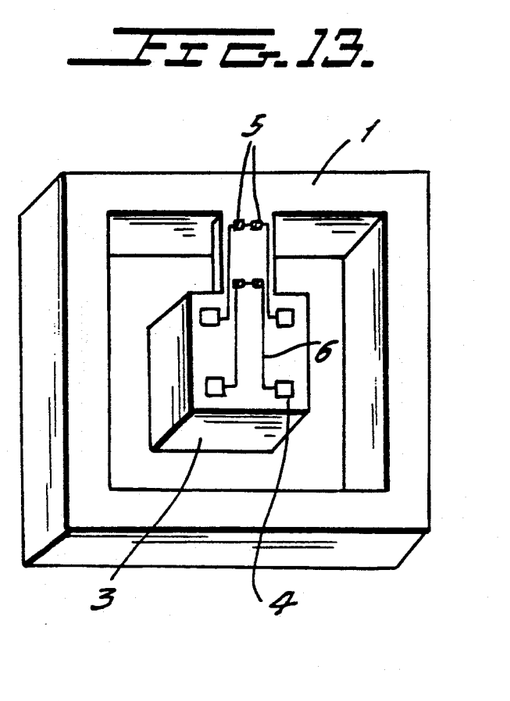
FIG. 13 is a perspective view to show the sixth embodiment of the semiconductor sensor device according to this invention.

Although FIG. 12 shows an embodiment where resistors are arranged in the same direction as the beams, they may be arranged as shown in FIGS. 11 through 13 to achieve the same effect. More particularly, in the sixth embodiment shown in FIG. 13, all the resistors are arranged perpendicularly to the beam while in the seventh embodiment shown in FIG. 14, they are arranged in parallel to each other but perpendicularly to the beam. In the eighth embodiment in FIG. 15, resistors are arranged in vertical and horizontal directions in combination. All the embodiments are expected to increase sensitivity similarly.

Figure 16:
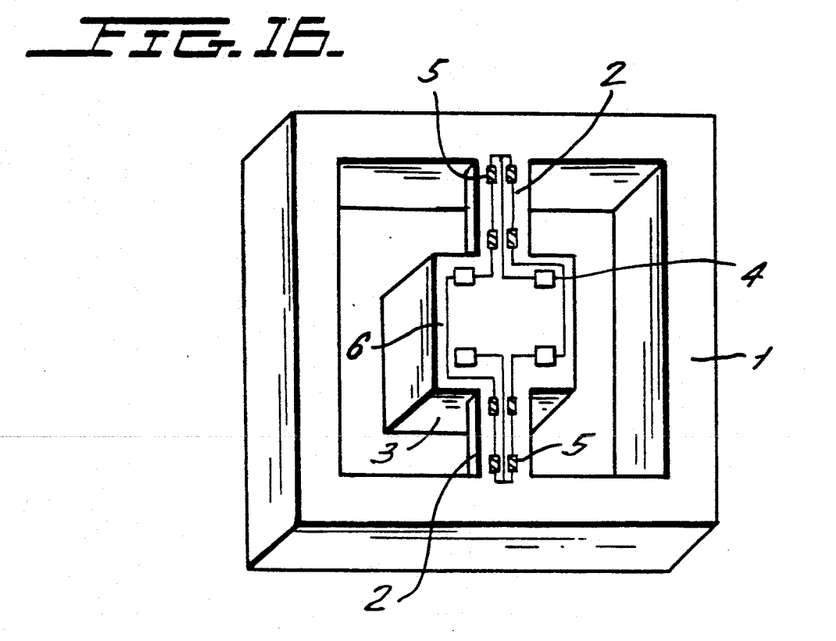
FIG. 16 is a perspective view to show the ninth embodiment of the semiconductor sensor device according to this invention.

FIG. 16 shows the ninth embodiment where the number of the beams is two. If two beams 5 are provided resistance against torsional movement improves to thereby increase durability of the acceleration sensor. As piezoresistors may be fabricated on those two beams, sensitivity can be doubled while maintaining the same durability.

Figure 14:
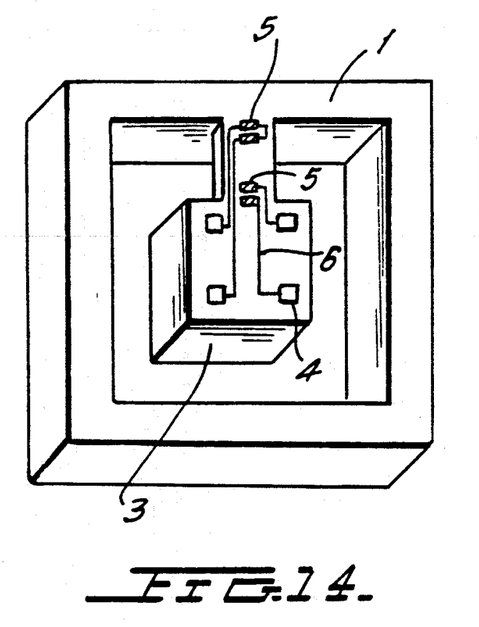
FIG. 14 is a perspective view to show to the seventh embodiment of the semiconductor sensor device according to this invention.
Figure 15:
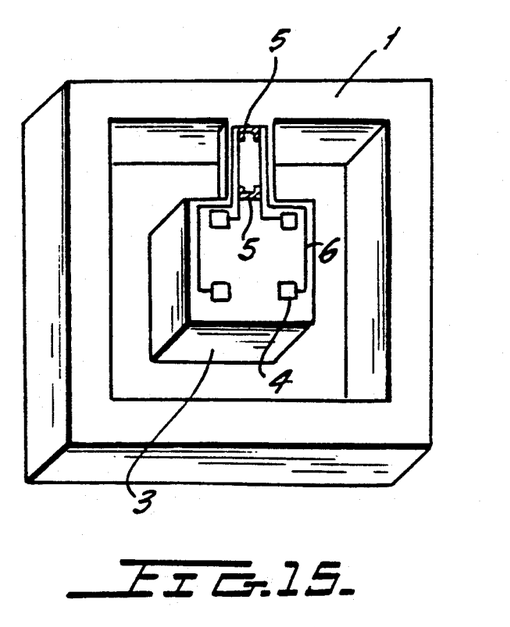
FIG. 15 is a perspective view to show the eighth embodiment of the semiconductor sensor device according to this invention.
Figure 17:
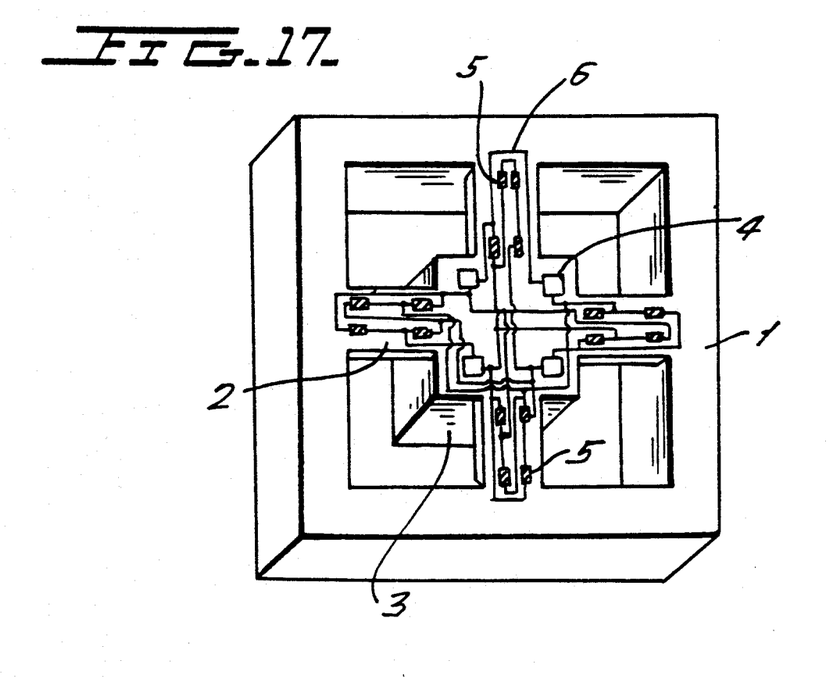
FIG. 17 is a perspective view to show the tenth embodiment of the semiconductor sensor device according to this invention.

If the number of the beam is increased to four and gauges are formed on each beam in an identical pattern and added by an adder as shown in the tenth embodiment of FIG. 17, sensitivity at least eight times as much as the conventional one can be attained. This means if the sensitivity is maintained at the same level as the prior art, the value of the stress applied on the supporting portion of one beam can be reduced to one eighth of the conventional structure. This is quite remarkable in preventing destruction and deterioration of beams. Although resistors are arranged only in the vertical direction in the embodiment with plural beams, they may be arranged in any variation as shown in FIGS. 13 through 15.

Figure 18:
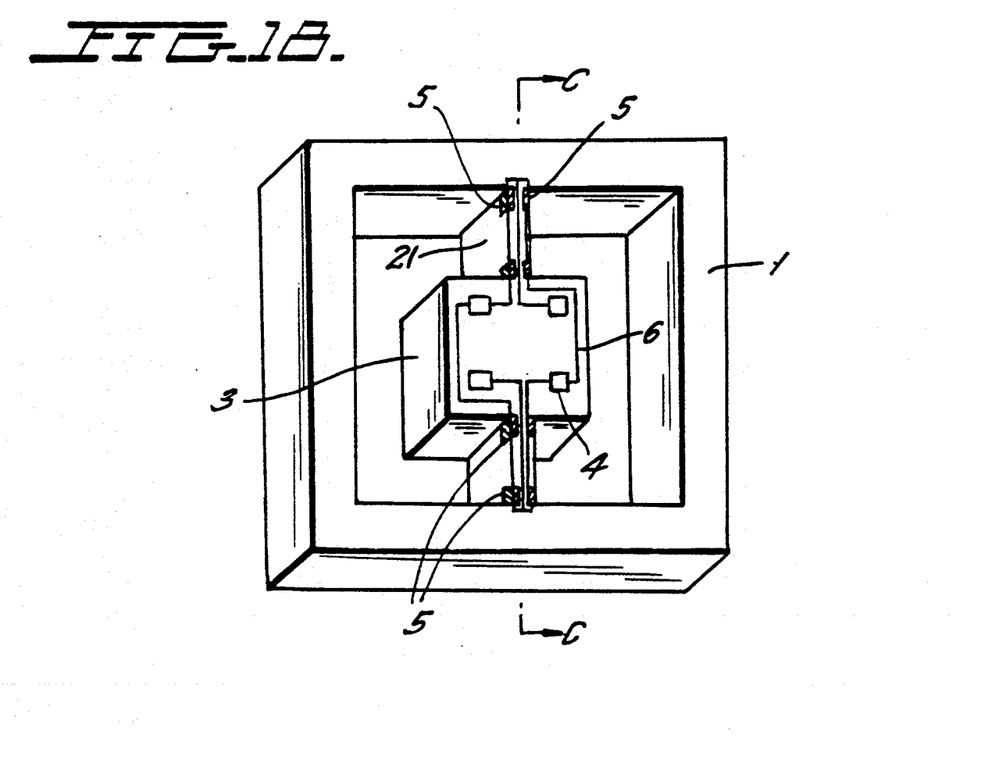
FIG. 18 is a perspective view to show the eleventh embodiment of the semiconductor sensor device according to this invention.
Figure 19A:
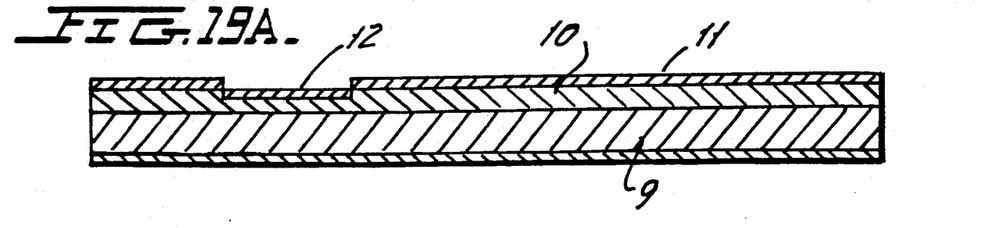
FIGS. 19A through 19D are cross-sectional views to show the manufacturing process of the sensor device shown in FIG. 18 along the line C—C thereof.
Figure 19B:
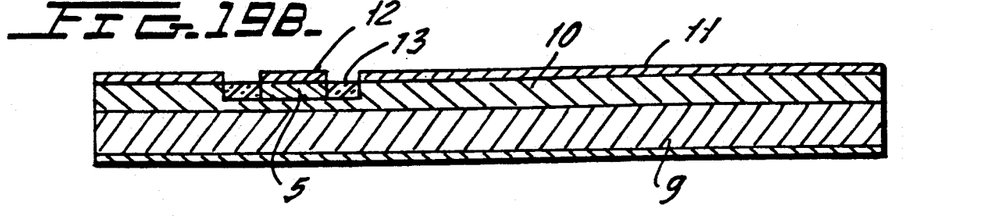
Figure 19C:
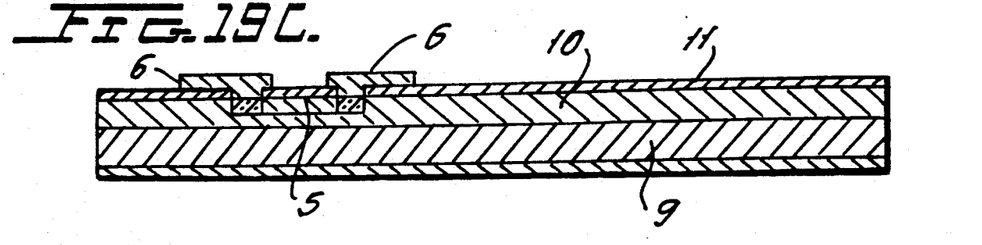
Figure 19D:
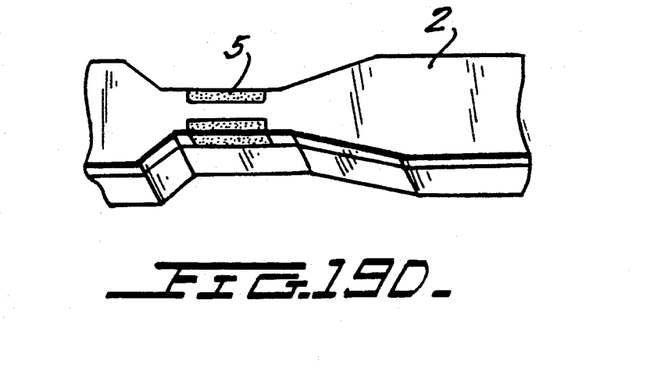
Figure 20:
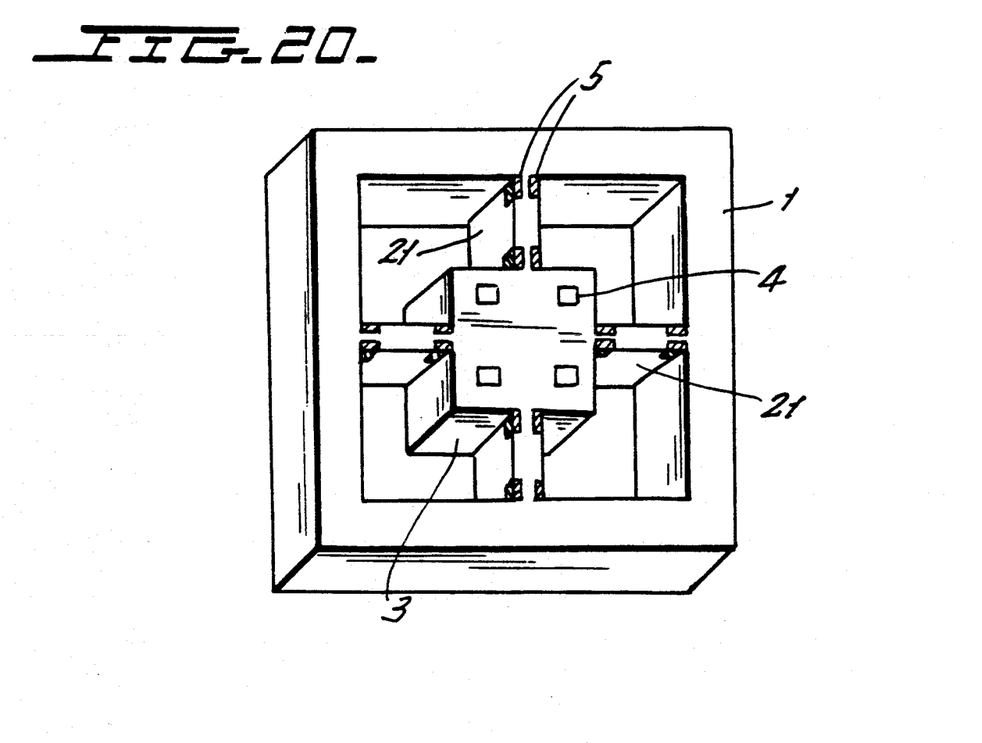
FIG. 20 is a perspective view to show the twelfth embodiment of the semiconductor sensor device according to this invention.

FIG. 18 shows the eleventh embodiment of the semiconductor accelerometer according to this invention. This embodiment is similar to the rim portion 1 and the base portion 3 but differs from the aforementioned embodiments only in the structure of the beam. In this embodiment, two beams are provided at two symmetrical positions, and the width of a beam is made less than the thickness thereof, that is, less than the thickness of the substrate. When a rotational force is applied, the beam 21 tends to be deformed in an arc. In order to obtain a larger moment by facilitating deformation, it is most critical to maintain the relative lengths of respective beams unchanged when the beams are being deformed. The length of respective beams should therefore be made identical. The stress produced on a beam becomes largest at the ends thereof. As the gauge resistors fabricated in a conventional way are limited in size, the stress cannot be fully utilized unless a beam is sufficiently longer than a resistor. Therefore, it is preferable to maximize the length of a beam. If the sufficient length cannot be allowed, the width of a beam may be partially reduced to concentrate the stress on the resistor. This is automatically achieved by providing in advance a gauge resistor 5 inside the region of a beam when viewed from the surface of the substrate, and cutting the region by etching until the end of the resistor. Signals are transformed into electric signals by the changes in resistance of a gauge resistor 5 fabricated on the side surface of the beam 2. An output is produced also when acceleration is caused by the translational movement in the direction vertical to the surface of the beam in this embodiment. However, if the sensor is centered with the rotational axis, the directions of the stress produced at ends of respective beams differ between the rotational and the translation movements. It is quite easy to distinguish one from the other if only both are added for the rotational movement while one is subtracted from the other for the translational movement because they are in the same direction in translation and in the opposite directions in rotational movement. It therefore becomes possible for one sensor to detect acceleration both in rotational movement as well as translational movement. An embodiment of the sensor may be fabricated by the process shown in FIGS. 19A through 19D. A p-type single crystal silicon 9 of 110 orientation is used as the substrate. An n-type epitaxial layer 10 is formed on the surface in order to fabricate a p-type gauge resistance. A gauge region is formed first by a known semiconductor process. Silicon oxide film 11 is formed on both surfaces of the substrate. The oxide film is partially removed by etching, and formed to have a window for gauge resistors by ion implantation. Boron is implanted through the window to form a p-type impurity injected layer 12 in the n-type epitaxial layer or in other words, a p-type strain gauge resistor 5 for detection of acceleration showon in FIG. 18. A p+ diffusion layer 13 is made on both sides of the p-type resistor, and ohmic contact is formed for taking out electric signals (FIG. 19B). Silicon oxide is deposited thereupon by CVD, and after having opened a part of the silicon oxide on said contacting region, an aluminum layer is vapor-deposited. Wires 14 and pads 4 are formed by etching the aluminum layer (FIG. 19C). Then, the oxide film on the back of the semiconductor substrate is partially removed and used as a mask. Using the mask, the substrate is anisotropically etched from above so as to make the gauge resistors 5 come to position on the side surface thereof with a solution of KOH or Hydrazine to obtain in accelerometer. FIG. 19D shows the gauge resistors 5 from diagonally above. FIG. 20 shows the twelfth embodiment. In this embodiment, four beams are built symmetrically from the fixed element to prevent deformation of the beams by lateral translational movement to thereby reduce crosstalk. As the number of the beams increases, it becomes possible to provide a larger number of gauge resistors to thereby enhance the sensitivity.

This sensor can also be used as a physical sensor in addition to said accelerometer as stated in the above simply by applying loads directly on the rim portion. Using the sensor, it becomes possible to manufacture a small sized torque-meter. In order to directly apply a load, for example, a minute rod may be contacted with the rim portion. If the beam has a thickness larger than the aforementioned embodiments, it can measure a force larger than them by the increment. For instance, even though aforementioned embodiments can measure only the forces in the order of miligrams, this embodiment can measure the forces in the order of grams or kilograms simply by increasing the thickness of the beams.

The sensor according to this invention can detect physical quantity other mechanical quantity such as acceleration, force or pressure if they can be transduced into mechanical quantities by one way or the other. For instance, when temperature is to be detected, if a diaphragm made of a material (any material such as a metal or an insulating material) having a different thermal expansion coefficient from that of the semiconductor forming a beam is provided on the beam, the beam functions as a bimetal to produce stress on the gauge resistor. The temperature can be detected by measuring the stress. If physical quantities other than mechanical quantity such as temperature are transduced into the movement of the above-mentioned rod used in a mechanical sensor, the physical quantities can be detected.

As described in detail in the foregoing statement, this invention places the reference point for detection of physical quantity at the center of a sensor contrary to the prior art sensor. Even though the size of the base portion of the sensor is smaller than the conventional one, the structure of the sensor is much more stable. Moreover, as this invention sensor has a weight for detection of physical quantities at the peripheral portion thereof instead of at the center thereof, it can increase the weight of the rim portion in proportion to the square of the distance from the center to thereby effectively use the area where the rim portion is situated. It becomes easy to reduce the area of a chip to one fourth of the conventional one if the weight used has the same mass as before. In other words, the number of sensors which can be manufactured from one substance increases to more than four times as much as before while the cost can be cut down counterproportionally the acceleration sensor can generally be varied in the scope of detectable frequency of acceleration and in sensitivity by selecting a suitable weight of the rim portion to be used. According to this invention, as the weight is positioned on the outer peripheries and the size thereof is larger than the conventional one, it is quite easy to obtain an accelerometer with a desirably high precision with an arbitrary detectable scope and sensitivity simply by selecting a method scribing for separation of chips. Further, it becomes possible to increase directivity by using plural beams to thereby obtain an accelerometer with less crosstalk.

The detection sensitivity can be increased by making all the resistors variable against physical quantities to be detected by locating gauge resistors at or around the connection between the rim portion and the beams additionally. If all the four resistors are variable, nonlinearity inherent in a piezoresistance device is cancelled to further enhance the linearity. As this invention sensor has plural beams, the degree of freedom of the vibration thereof can be restricted to thereby increase the directivity. As the same sensitivity can be attained even though the values of the normal stress on a beam are maintained at a reduced level, a sensor with a high shock resistance can be obtained.

If the sensor is shaped symmetrically, unnecessary vibration mode which occurs in the abnormally high frequency zones and which might contribute to destruction of a beam can be prevented to thereby enhance durability. As there is a difference in the thickness of the silicon between the beams and the rim portion, when the temperature drastically changes, there is caused a temperature difference between the elements changing resistance of the gauge resistor for detecting acceleration. This poses a problem. However, if all the resistors are arranged on the beams, the effect of such changes becomes negligible. This invention therefore can reduce the draft in respect of the temperature. As all the resistors are positioned oon the beams, all of them are subject to the same internal stress to thereby reduce the offset in output voltages which otherwise is caused by the occurrence of the internal stress in the semiconductor substrate during the manufacturing process. Although all the beams are provided with resistors in the above embodiment, if there are a plurality of beams, the resistors may be provided on only one of them.

As this invention enables to provide a semiconductor rotational force sensor of light weight and small size which could be achieved in the prior art, it can easily provide a rotational sensor which is inexpensive, small and easily to handle.

Although in the above described embodiments, the rim portions were illustrated limited to a square, they may be in any polygonal shape or circular. They do not have to be arranged symmetrically. Although the precise position of a circuit which processes signals is not described in the above description, the semiconductor circuit may be fabricated on the wider weight area formed on the periphery rather than at the central fixed area because the accelerometer receives acceleration signals as a package, and therefore the rim portion and the base portion are subject to the same impact.

In the embodiments wherein semiconductor gauge resistors are arranged in the direction vertical to the substrate surface, it is possible to effectively detect acceleration around an axis vertical to the substrate surface. As the sensor has an extremely large rigidity against the force vertical to the substrate surface, it is not necessary to take extra caution when the sensor is to be housed in a package. As the stress caused by the rotational force on the movable parts of the sensor is initiated only when the fixed point at the center of the sensor is placed on an object of measurement, the stress is not generated when the element is not fixed like in a wafer. Therefore, this invention sensor can be handled very easily and beams are not broken during the manufacturing process as is often the case in the prior art. As is in the above embodiments, if semiconductor gauge resistors are formed on ends of respective beams, stresses in opposite phases will be produced by the same deformation on the surface and the reverse surface of the side of the beam. Utilizing such a fact, a plurality of resistor full-bridge circuits may be formed to achieve an extremely high detection sensitivity. For simplicity's sake, the number of gauges may be decreased. Although it is preferable to provide gauge resistors on the side surfaces of a beam as it achieves high efficiency of displacement-electric resistance conversion ratio, gauge resistors may be provided slightly inside the surface to achieve detection even though sensitivity deteriorates. Further, it is possible to use a weight of the maximum size so far as the length of a beam and the size of a semiconductor wafer allow because the weight is located on the peripheral area surrounding the fixed element.

Although an n-type epitaxial layer is formed on a substrate in order to fabricate a p-type semiconductor strain gauge in the above-mentioned embodiments, an expensive epitaxial wafer does not necessarily have to be used if n-type is used for gauge resistors or a well structure is formed by diffusion.

What is claimed is:

1. A semiconductor sensor device for measuring a physical effect, comprising:
   a support member, and a sensor member provided on said support member,
   said sensor member being made of monolithic semiconductor material and having a base portion and a rim portion connected to each other by a thin beam portion,
   said base portion being fixed to said support member and thereby serving as a reference point for measuring said physical effect,
   said rim portion being held by said beam portion such that said rim portion is spaced apart from said base portion and said support member so as to serve as a weight suspended from said base portion by said beam portion, said beam portion being provided with a resistor, and said base portion being provided with a pair of electrode terminals electrically connected to said resistor, to detect changes of resistance values of said resistor due to mechanical stress caused at said beam portion by said physical effect to be measured.

2. The semiconductor sensor device as claimed in claim 1, wherein said rim portion is held by an additional beam portion extending between said base portion and said rim portion.

3. The semiconductor sensor device as claimed in claim 1, wherein said support member has a spacer member sandwiched between a bottom plate and an upper plate to form an envelope, said base portion is fixed on a projection portion provided on said bottom plate such that said electrode terminals are faced toward an opening provided in said upper plate, and said electrode terminals are connected to respective external electrode leads formed on said upper plate with bonding wires through said opening.

4. The semiconductor sensor device as claimed in claim 1, wherein three additional beam portions are provided between said base portion and rim portion to form a crossed beam arrangement, each of said additional beam portions are provided with a resistor, two of said resistors in a first pair of said beam portions extending in a first direction are formed respectively nearby said base portion while the remaining two of said resistors in a second pair of the beam portions extending in a second direction prependicular to the first direction are formed respectively nearby said rim portion, two additional electrode terminals being provided on said base portion and said resistors on said beam portions being connected in series by said four electrode terminals provided on said base portion so as to form a full-bridge circuit, external electrode leads being formed on said base portion, and said electrode terminals are respectively connected to said external electrode leads formed on said base portion.

5. The semiconductor sensor device as claimed in claim 1, wherein said support member forms a housing containing said sensor member, said housing has projected conductor connectors exposed to an opening formed on the upper surface of an said housing, and said electrode terminals are directly coupled with said projection conductor connectors in a manner to suspend said base portion so that said rim portion and beam portion are spaced apart from inner walls of said housing.

6. The semiconductor sensor device as claimed in claim 1, wherein said beam portion is formed with a pair of said resistors nearby said base portion and with a pair of said resistors nearby said rim portion, said resistors are connected to each other to form a full-bridge circuit and connected to four electrode terminals provided on said base portion serially with said wiring conductors.

7. The semiconductor sensor device as claimed in claim 1, where in the width of said beam portion is less than the thickness thereof.

* * * * *